US008213631B2

(12) United States Patent
Couvillon, IV

(10) Patent No.: US 8,213,631 B2
(45) Date of Patent: Jul. 3, 2012

(54) SOUND SYSTEM WITH MULTIPLE SPEAKERS

(76) Inventor: Tucker H. Couvillon, IV, Clemson, SC (US)

( * ) Notice: Subject to any disclaimer, the term of this patent is extended or adjusted under 35 U.S.C. 154(b) by 1557 days.

(21) Appl. No.: 11/656,665

(22) Filed: Jan. 23, 2007

(65) Prior Publication Data

US 2008/0175405 A1 Jul. 24, 2008

(51) Int. Cl.
*H04B 1/00* (2006.01)
*H04B 3/00* (2006.01)
*H02B 1/00* (2006.01)

(52) U.S. Cl. ............. 381/86; 381/123; 381/77; 307/9.1; 307/10.1; 307/112; 307/113; 307/115

(58) Field of Classification Search .................... 381/86, 381/82, 123, 77; 307/9.1, 10.1, 112, 113, 307/115
See application file for complete search history.

(56) References Cited

U.S. PATENT DOCUMENTS 2,572,221 A * 10/1951 Voigt .............................. 381/82

OTHER PUBLICATIONS

Instruction Sheet for High Powered Stereo Speaker Control Center; Copyright 1999; Catalog No. 40-244; Author Tandy Corporation; (2 pages).

* cited by examiner

*Primary Examiner* — Devona Faulk
(74) *Attorney, Agent, or Firm* — J. Bennett Mullinax, LLC

(57) ABSTRACT

A sound system that may be used for a vehicle is provided. The system includes a head unit configured for generating an electrical signal, and a relay is configured to receive an electrical signal from the head unit. An interior speaker is carried by the vehicle and is configured for receiving an electrical signal from the relay in order to produce sound. An exterior speaker is carried by the vehicle and is configured for receiving an electrical signal from the relay in order to produce sound. A switch is configured to be opened and closed in order to trip the relay between a first state in which the interior speaker produces sound and the exterior speaker does not produce sound and a second state in which the interior speaker does not produce sound and the exterior speaker produces sound. A method of controlling a sound system is also provided.

13 Claims, 4 Drawing Sheets

SOUND SYSTEM WITH MULTIPLE SPEAKERS

FIELD OF THE INVENTION

The present invention relates generally to sound systems. More particularly, the present application involves a sound system for use with a vehicle that includes multiple, selectable speakers from which sound can be produced.

BACKGROUND

Sound systems are commonly found in homes, offices and vehicles for generating audio output. In an automobile, for instance, the sound system may include a head unit such as a radio, tape player, compact disc player, or mp3 player. The head unit in some vehicles may even include a DVD player with a liquid crystal display screen mounted into the center dash console, interior roof, or headrest backs. The head unit in some vehicles may also include an automotive navigation system for directing the driver to his or her destination.

The head unit functions so as to direct an electrical signal of a particular frequency to a speaker to produce a desired sound. A speaker generally includes a voice coil attached to an apex of a cone. The voice coil is oriented inside of a gap established between a permanent magnet. Application of the electrical signal to the voice coil causes an electromagnet to be formed. The voice coil and cone then vibrate to produce sound at the frequency of the electrical signal. Speakers run off of A/C current while other components of the sound system and vehicle generally run off of D/C current.

As the vast majority of sound systems in automobiles deliver stereo sound, multiple speakers are located in the interior driving compartment. Stereo sound seeks to mimic natural sound by generating sound from two or more directions. In this regard, two or more independent audio channels may be used to create sounds through symmetrically configured speakers. Speakers in automobiles may be located in the dashboard, doors, or back window area. Various types of speakers include tweeters for use with small, high frequencies, and woofers for large, low frequencies. Midrange speakers are also available for handling frequencies between small and large. Additional types of speakers that may be incorporated into vehicle sound systems include subwoofers that are used in conjunction with bass frequencies.

Sound systems in vehicles can thus be provided that are more powerful and offer different features than those included standard in the vehicle by the manufacturer. Typically, an upgraded alternator and/or an additional battery are installed into the vehicle in order to provide the necessary additional power. Additional power may also be desirable should one wish to keep the sound system running when the engine is turned off. For example, tailgating at football games is a common activity in which it is desirable to run the sound system of a vehicle while the engine is shut off. While additional power may be desirable, it is to be understood that upgraded alternators and/or additional batteries are not always used or needed when running a sound system during tailgating. Further, since the tailgaters are generally located outside of the vehicle, a sound system with speakers in the interior compartment may not be adequate as the generated sound may be muffled. As such, additional speakers located closer to the tailgaters, possibly outside of the interior compartment, may be included in order to cause a higher quality sound to be heard. Unfortunately, the incorporation of speakers in addition to those in the interior compartment requires additional controlling elements be included in order to effect their operation. As such, there remains room for variation and improvement within the art.

SUMMARY

Various features and advantages of the invention will be set forth in part in the following description, or may be obvious from the description, or may be learned from practice of the invention.

One aspect of one exemplary embodiment provides for a sound system that has a power source. A head unit is powered by the power source and is configured for generating an electrical signal. A relay is in communication with the head unit and is configured for receiving an electrical signal generated by the head unit. The relay has a first output and a second output so as to direct an electrical signal therefrom. A first speaker is in communication with the relay. The first speaker is configured for receiving an electrical signal from the first output of the relay. A second speaker is in communication with the relay. The second speaker is configured for receiving an electrical signal from the second output of the relay. A switch is present and is configured to be opened and closed in order to trip the relay between a first state in which the relay is configured to direct an electrical signal from the first output to the first speaker and a second state in which the relay is configured to direct an electrical signal from the second output to the second speaker.

Another aspect of one exemplary embodiment provides for a sound system for a vehicle that has a head unit configured for generating an electrical signal. A relay is present and is configured to receive an electrical signal from the head unit. The relay has a first output and a second output. An interior speaker is carried by the vehicle and is positioned so as to direct sound produced therefrom primarily into the interior passenger compartment of the vehicle. The interior speaker is configured for receiving an electrical signal from the relay in order to produce sound. An exterior speaker is present and is carried by the vehicle. The exterior speaker is positioned so as to direct sound produced therefrom primarily outside of the interior passenger compartment of the vehicle. The exterior speaker is configured for receiving an electrical signal from the relay in order to produce sound. A switch is included and is configured to be opened and closed in order to trip the relay between a first state and a second state. In the first state the interior speaker produces sound and the exterior speaker does not produce sound. In the second state the interior speaker does not produce sound and the exterior speaker produces sound.

Another aspect of one exemplary embodiment provides for a method for controlling a sound system of a vehicle. The method includes the step of sending an electrical signal to a relay. Also included is the step of switching the relay between an open and closed position in which the relay directs an electrical signal out of a first outlet in one of the open and closed positions and out of a second outlet in the other of the open and closed positions. The method also includes the step of generating a sound directed primarily into the interior passenger compartment of the vehicle when an electrical signal is transferred from the first outlet of the relay. The method further includes the step of generating a sound directed primarily outside of the interior passenger compartment of the vehicle when an electrical signal is transferred from the second outlet of the relay.

These and other features, aspects and advantages of the present invention will become better understood with reference to the following description and appended claims. The accompanying drawings, which are incorporated in and constitute part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended Figs. in which.

Figure 1:
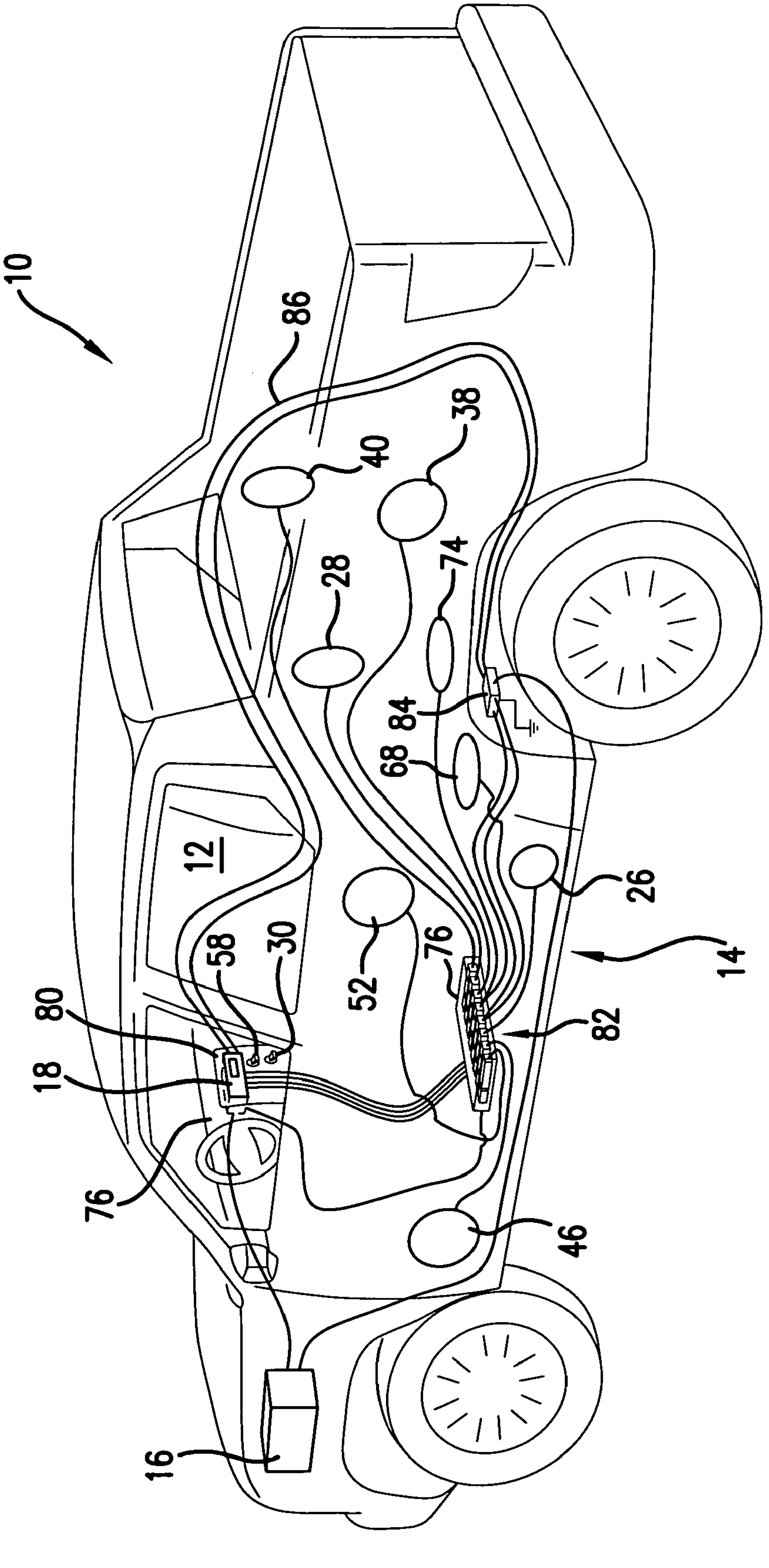
FIG. 1 is a perspective view of a sound system in accordance with one exemplary embodiment incorporated into a vehicle.

Repeat use of reference characters in the present specification and drawings is intended to represent the same or analogous features or elements of the invention.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

The present invention provides for a sound system 14 and an associated method of controlling a sound system 14. The sound system 14 can be incorporated into a vehicle 10 in order to cause sound to be generated in an interior passenger compartment 12 of the vehicle 10. A switch 30 may be employed in order to cause sound to stop being generated in the interior passenger compartment 12 and instead be generated at a location on the vehicle 10 that is outside of the interior passenger compartment 12. Additional exemplary embodiments are also possible in which sound may be generated by the sound system 14 both inside and outside of the interior passenger compartment 12. Although described as being employed in conjunction with a vehicle 10, other exemplary embodiments exist in which the sound system 14 is not incorporated into a vehicle 10.

FIG. 1 shows a vehicle 10 that employs a sound system 14 in accordance with one exemplary embodiment. It is to be understood that certain elements in FIG. 1 are shown schematically and that additional elements may or may not be present. The sound system 14 may include a power source 16 that can be the vehicle's battery or an alternator. Alternatively, the power source 16 may be a dedicated battery for the sound system 14 or for other add-on electronics that are incorporated into the vehicle 10. The sound system 14 is designed for generating sound that is generally directed into the interior passenger compartment 12 of the vehicle 10 in which the driver and occupants sit. The sound system 14 may also be configured to generate sound that is generally directed outside of the interior passenger compartment 12. For example, exterior speakers 28 and 40 can be located in the bed of vehicle 10 and may be used to generate sound from the sound system 14 when conducting activities such as tailgating at football games.

Figure 2:
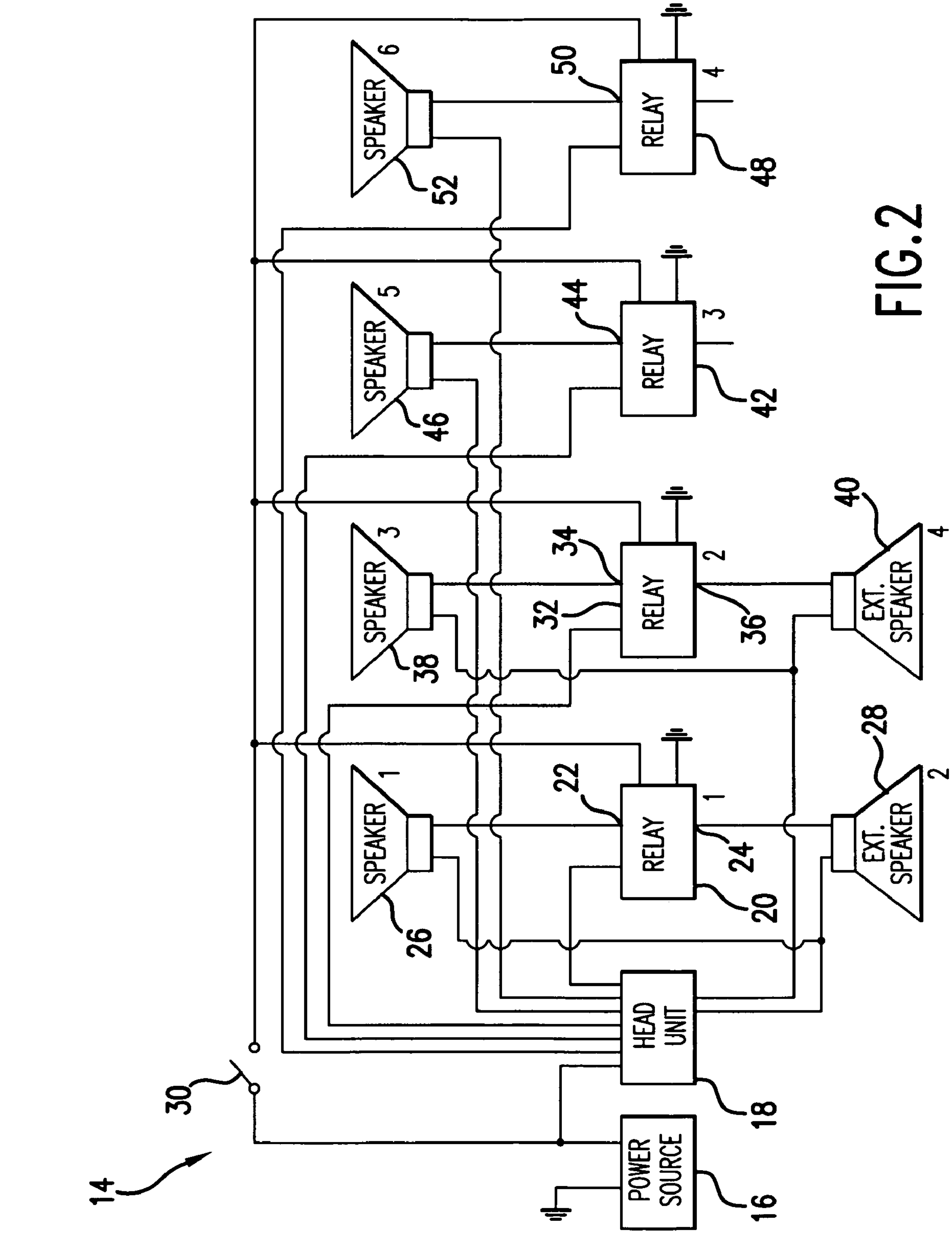
FIG. 2 is an electrical schematic diagram of a sound system in accordance with one exemplary embodiment.

An electrical schematic diagram of one exemplary embodiment of the sound system 14 is shown in FIG. 2. As shown, a power source 16 provides power to a head unit 18 of the sound system 14. Head unit 18 can be a radio, tape player, compact disc player or mp3 player in accordance with certain exemplary embodiments. The heat unit 18 can function so as to create an electrical signal indicative of a particular sound. The electrical signal may be transferred to a speaker and converted into an actual sound by the speaker in a known manner. Although not shown, additional components such as amplifiers may be incorporated into the sound system 14.

Head unit 18 is in communication with relay 20. It is to be understood that as described herein, including in the claims, that the use of the term communication is broad enough to cover communication that is both two way between elements or is one way between elements. Relay 20 functions so as to direct an electrical signal from the head unit 18 out of either a first output 22 or a second output 24. Relay 20 is designed so that when the electrical signal is directed out of first output 22, no electrical signal is transferred out of second output 24. In a similar manner, when the electrical signal is transferred out of the second output 24, no electrical signal is transferred out of the first output 22.

The sound system 14 also includes a switch 30. Switch 30 is used to trip relay 20. In this regard, actuation of switch 30 acts to open and close a circuit relating to relay 20 so as to cause relay 20 to switch between outputting the electrical signal through the first output 22 and the second output 24. Relay 20 may trip as a result of a voltage difference between two poles which causes an electromagnet in relay 20 to fire. Relay 20 may be able to trip with any applied voltage even at very low amperage. As such, the electrical line leading into relay 20 for purposes of tripping relay 20 may be provided so it that need only handle low amperage. As shown in FIG. 2, opening and closing of switch 30 causes a voltage from power source 16 to be applied and removed from relay 20 to effect a voltage difference to cause relay 20 to trip. Relay 20 is grounded as shown.

Relay 20 is in communication with a first speaker 26 and a second speaker 28. In this regard, the first output 22 of relay 20 can direct an electrical signal from relay 20 to the first speaker 26, and the second output 24 of relay 20 can direct an electrical signal from relay 20 to the second speaker 28. First speaker 26 may be an interior speaker of the vehicle 10 and can be located behind the driver on the driver side of the vehicle 10 in one embodiment. Second speaker 28 can be an exterior speaker that is located outside of the interior passenger compartment 12. Speakers 26 and 28 can receive the electrical signal from relay 20 in order to produce sound. In this regard, speakers 26 and 28 typically utilize A/C current and have grounding lines that could be spliced onto one another if desired, that return to the head unit 18. Various wires in the sound system 14 can be colored in accordance with after market schemes, manufactures' schemes, or can be unique to the particular sound system 14 in various embodiments.

The sound system 14 as shown in FIG. 2 includes a second relay 32. Second relay 32 may be provided in a manner similar to that of relay 20. In this regard, second relay 32 has a first output 34 and a second output 36 through which an electrical signal communicated from the head unit 18 may be directed. Second relay 32 can set so that the electrical signal is directed out of the first output 34 and not the second output 36. Second relay 32 can be tripped to cause the electrical signal to instead go out of the second output 36 and not out of the first output 34. Second relay 32 may be tripped in a manner similar to that of relay 20 in which the opening and closing of switch 30 causes second relay 32 to alternate directing the electrical signal between the first and second outputs 34 and 36. Again, a voltage difference applied to the grounded second relay 32 from the power source 16 may act to cause the second relay 32 to trip.

A third speaker 38, which may be a second interior speaker, and a fourth speaker 40, which may be a second exterior speaker, are in communication with the second relay 32. Output from the first output 34 is directed to the third speaker 38, and output from the second output 36 is directed to the fourth speaker 40. Speakers 38 and 40 are grounded to the head unit 18 and may be splice onto one another if desired. In the manner shown, the third speaker 38 produces sound when relay 32 directs an electrical signal from first output 34 and at such time a sound is not made by the fourth speaker 40. Likewise, when fourth speaker 40 produces sound upon receiving the electrical signal from second output 36 the third speaker 38 does not produce sound.

The switch 30 in the sound system 14 of FIG. 2 may be placed into either a first state or a second state upon either opening or closing. In the first state, electrical signals from the first relay 20 and second relay 32 are directed out of the first output 22 and the first output 34 to the first speaker 26 and third speaker 38. Sound is thus produced by the first speaker 26 and third speaker 38 which may be, for instance, the rear speakers in the interior passenger compartment 12 of the vehicle 10. In the first state, sound is not produced by the second speaker 28 or fourth speaker 40 which may be, for instance, exterior speakers in the bed of the vehicle 10. Switch 30 may then be thrown by the user in order to be placed into a second state. Doing so causes a voltage difference to be applied to the first relay 20 and the second relay 32 in order to cause these two relays 20 and 32 to trip so that electrical signals are no longer sent through the first outputs 22 and 34. Instead, electrical signals are directed out of the second outputs 24 and 36 into the second speaker 28 and fourth speaker 40 in order to produce sound therefrom. In the second state, sound is not produced from the first speaker 26 and the third speaker 38. The switch 30 may once again be actuated from the second state back into the first state once sound is desired to be heard from the first speaker 26 and third speaker 38 and not from the second speaker 28 and fourth speaker 40.

The sound system 14 may include additional components such as the third relay 42 as shown in FIG. 2. The third relay 42 has a first output 44. Third relay 42 is in communication with the head unit 18 so that an electrical signal from head unit 18 can be transferred to the third relay 42 and out of the first output 44. The third relay 42 may have a voltage difference from power source 16 and switch 30 applied thereto to cause the third relay 42 to trip. The third relay 42 is grounded in a manner similar to those previously discussed. Tripping the third relay 42 causes the electrical signal to be alternately transferred out of the first output 44. As shown, the third relay 42 does not have a second output therefrom in order to direct the electrical signal to a speaker or other element when the electrical signal is not transferred out of the first output 44. Instead, the electrical signal is not sent to an additional element. When sent through the first output 44, the electrical signal is directed to a fifth speaker 46 which may be an additional internal speaker in the vehicle 10. The fifth speaker 46 has a grounding line that returns to the head unit 18 as previously discussed with other speakers in the sound system 14.

A fourth relay 48 may also be included and can be configured in a manner similar to the third relay 42. In this regard, the fourth relay 48 has a first output 50 from which an electrical signal may be directed. The fourth relay 48 can be tripped in a manner similar to that previously discussed with respect to the third relay 42 and need not direct the electrical signal to another element of the sound system 14 when not directing it out of the first element 50. A sixth speaker 52 is present and may be a second additional interior speaker in accordance with one embodiment. The sixth speaker 52 receives electrical input from the first outlet 50 and produces a corresponding sound.

The third relay 42 and fourth relay 48 may be incorporated into the sound system 14 so that when the switch 30 is positioned into the first state, electrical signals are directed out of the first outputs 44 and 50 in order to cause the fifth speaker 46 and sixth speaker 52 to create sound. In this regard, the sound system 14 has a first state in which speakers 26, 38, 46 and 52 generate sound and in which speakers 28 and 40 do not generate sound. The switch 30 may be moved into a second state in which speakers 26, 38, 46 and 52 do not generate sound and in which speakers 28 and 40 do generate sound. Referring to FIG. 1, speakers 26 and 38 may be the back speakers in the interior passenger compartment 12 while speakers 46 and 52 are the front speakers in the interior passenger compartment 12. Moving the switch 30 from the first to the second state causes sound to be cut off from the front speakers 46 and 52 and causes sound from the back speakers 26 and 38 to be transferred back to the external speakers 28 and 40. As such, sound is on in the interior passenger compartment 12 and off on external speakers in one state and the opposite is true when the switch 30 is placed into the second state.

Figure 3:
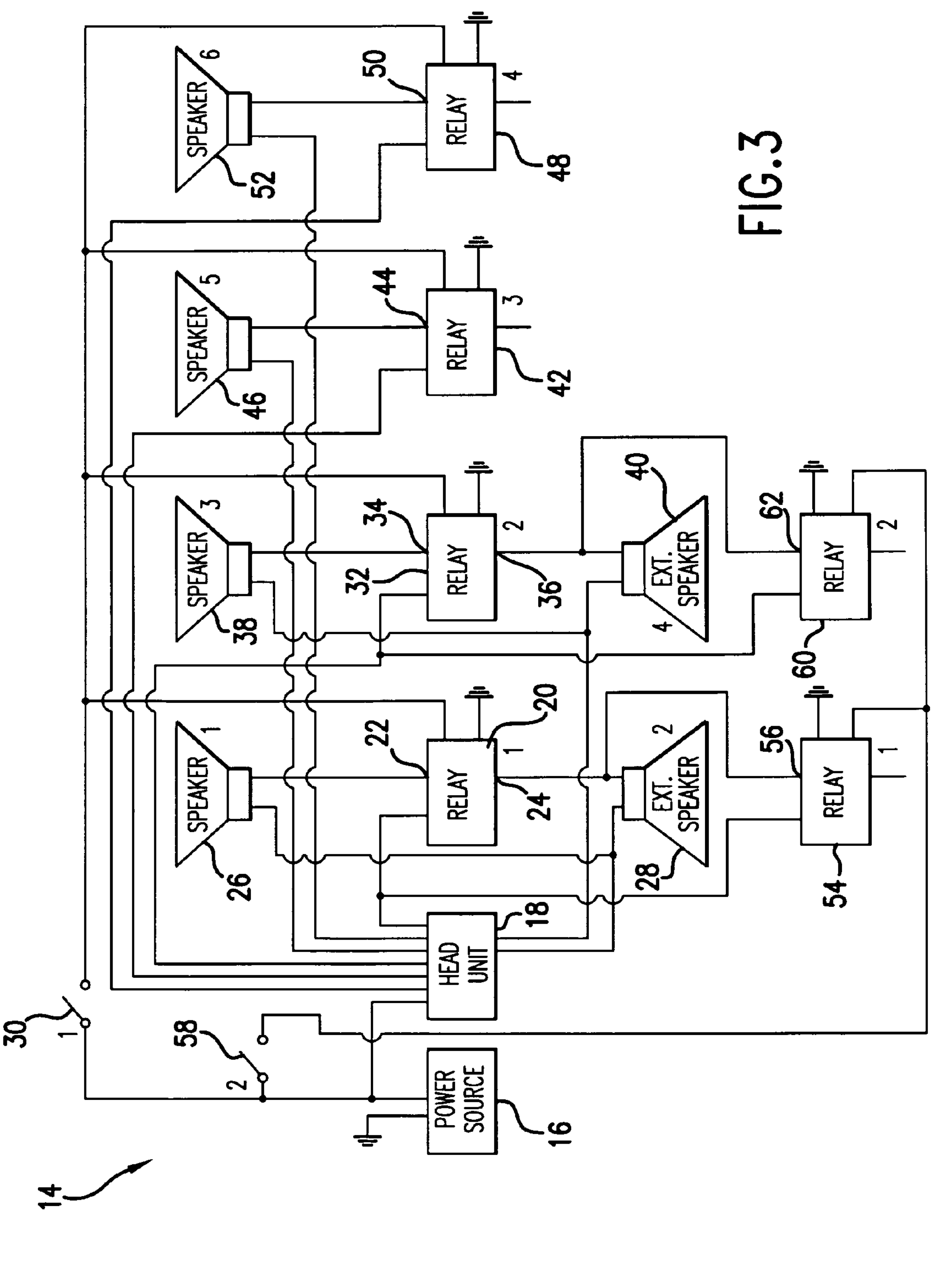
FIG. 3 is an electrical schematic diagram of a sound system in accordance with another exemplary embodiment.

An additional exemplary embodiment of the sound system 14 is shown in FIG. 3. The sound system in FIG. 3 incorporates the same components in the same configuration as those described in relation to FIG. 2. However, additional components are added. For instance, a first additional relay 54, which may be a first exterior relay, is included and is placed into communication with the head unit 18. The first additional relay 54 has a first output 56 through which an electrical signal from the head unit 18 can be transferred. The first additional relay 54 does not have a second output but instead electrical signals from the first additional relay 54 are not transferred to an additional component at times when they are not transferred through the first output 56. The first additional relay 54 can be tripped through the application of a voltage differential. As shown, a second switch 58 is present through which voltage may be directed into the first additional relay 54 and then returned to ground as shown. The second switch 58 can be positioned between opened and closed positions in order to be placed into a first state and second state. In the first state, the electrical signal from head unit 18 is not directed out of the first output 56. Here, the electrical signal simply ends and does nothing. In the second state, the electrical signal is directed out of the first output 56 to the second speaker 28 which may be an exterior speaker in accordance with one embodiment.

In accordance with certain exemplary embodiments, a second additional relay 60 may be provided. The second additional relay 60 can be configured in a manner similar to that previously discussed with respect to the first additional relay 54. Here, the second additional relay 60 has a first output 62 through which an electrical signal from head unit 18 can be directed. Second additional relay 60 does not direct the electrical signal to another component at times when it is not directed out of the first outlet 62. The second additional relay 60 is in communication with the fourth speaker 40 and is tripped upon opening and closing of the second switch 58.

The exemplary embodiment shown in FIG. 3 affords the sound system 14 with the added capability of having all of the speakers 26, 28, 38, 40, 46 and 52 turned on at the same time. In this regard, speakers 26 and 38 may be back interior speakers while speakers 46 and 52 are front speakers in the interior passenger compartment 12 of vehicle 10. As with the previous embodiment, speakers 28 and 40 can be exterior speakers that are mounted onto the roof or in the trunk or bed of vehicle 10. Switches 30 and 58 can be in the first state in which sound is generated in the interior passenger compartment 12 by way of speakers 26, 38, 46 and 52 while exterior speakers 28 and 40 are silent. Flipping switch 30 to the first state and leaving switch 58 in the first state causes sound to be generated by exterior speakers 28 and 40 and cause the interior speakers 26, 38, 46 and 52 to become silent. Flipping switch 30 back to the first state again causes speakers 26, 38, 46 and 52 to generate sound while speakers 28 and 40 are silent. However, switch 58 can then be moved into the second state while switch 30 is in the first state. Doing so causes speakers 28 and 40 to generate sound so that these speakers in addition to all of the speakers in the interior passenger compartment 12 generate sound. The sound system 14 can thus be configured so that sound is generated so as to be directed generally into the interior passenger compartment 12 and not directed generally outside of the interior passenger compartment 12. Alternatively, sound may be generated so as to be directed generally outside of the interior passenger compartment 12 and not generated to be directed generally inside of the interior passenger compartment 12. The additional components of the embodiment in FIG. 3 allows for sound to be generated so as to be directed both into and outside of the interior passenger compartment 12.

Figure 4:
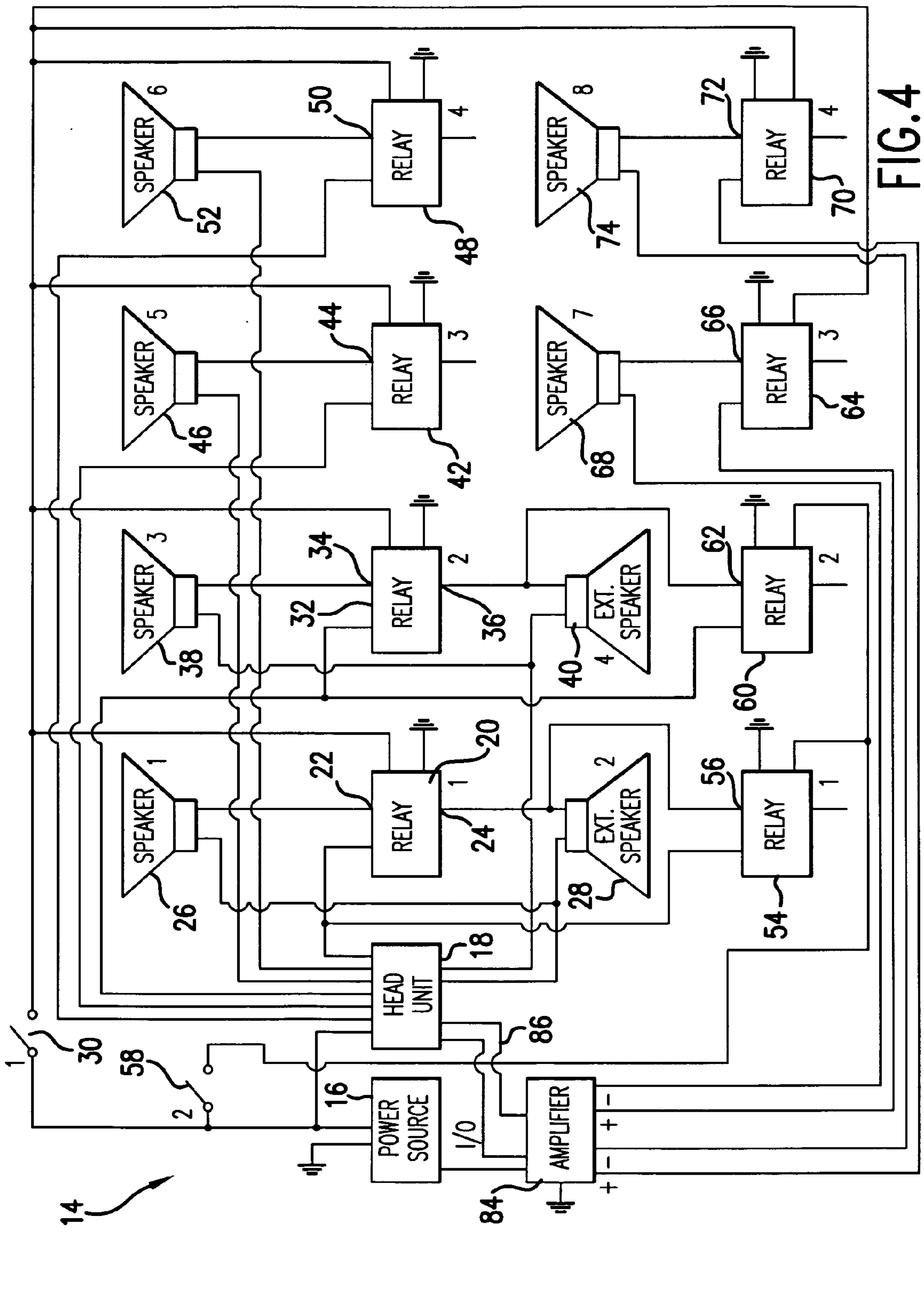
FIG. 4 is an electrical schematic diagram of a sound system in accordance with yet another exemplary embodiment.

Additional components may be incorporated into the sound system 14 as shown for example with reference to FIG. 4. Here, the sound system 14 is configured the same as that in FIG. 3 with the exception of additional components being added. A third additional relay 64 is included and is in communication with a seventh speaker 68. A fourth additional relay 70 is also present and is in communication with an eighth speaker 74. Relays 64 and 70 can be tripped between a first state and a second state through actuation of switch 30 which causes a voltage difference to be applied thereto. Relays 64 and 70 are grounded in a manner similar to those previously discussed. In the first state, electrical signals from the head unit 18 may be directed through the relays 64 and 70 and out of first outputs 66 and 72. Seventh speaker 68 and eighth speaker 74 receive the electrical signals from first outputs 66 and 72 and cause sound to be produced. When the third and fourth additional relays 64 and 70 are tripped to the second state, the electrical signals are not sent out of the first outputs 66 and 70 and as such sound is not produced by speakers 68 and 74.

The seventh speaker 68 and the eight speaker 74 may be subwoofers located in the interior passenger compartment 12 of vehicle 10. When switch 30 is placed into the first state, speakers 26, 38, 46, 52, 68 and 74 produce sound while speakers 28 and 40 do not produce sound. Converting switch 30 to the second state causes speakers 26, 38, 46, 52, 68 and 74 to become silent while speakers 28 and 40 generate sound. Second switch 58 may also be used to turn all of the speakers on as previously discussed.

The exemplary embodiment in FIG. 4 also includes an amplifier 84. Amplifier 84 may be powered by the power source 16. A line 86 between the head unit 18 and amplifier 84 can be used to direct a signal from the head unit 18 to the amplifier 84 to turn the amplifier 84 on and off. An additional line between these two components may also be in place in order to direct electrical signals from the head unit 18 to the amplifier 84. Relays 64 and 70 are in communication with amplifier 84 and electrical signals from amplifier 84 can be directed through relays 64 and 70 and into speakers 68 and 74. Grounding lines return from speakers 68 and 74 back to amplifier 84. Amplifier 84 may act to amplify the electrical signal from the head unit 18 to relays 64 and 70. Again, although described as speakers 68 and 74, these components may be subwoofers in accordance with certain exemplary embodiments. Also it is to be understood that in other embodiments the amplifier 84 need not be present to direct electrical signals from head unit 18 to speakers 68 and 74. Additionally or alternatively, amplifiers could be used to direct signals to other speakers of the sound system 14.

As described, certain relays such as relays 42, 48, 54, 60, 64 and 70 do not have a second output. It is to be understood that this is not a limiting term but simply refers to the fact that the electrical signal is not directed to another component, such as a speaker, to generate sound when not directed out of the first outputs 44, 50, 56, 62, 66 and 72. The relays 42, 48, 54, 60, 64 and 70 may indeed have a line extending therefrom that corresponds to a second output. However, as described the second output does not communicate with another component in accordance with various exemplary embodiments.

Referring back to FIG. 1, the sound system 14 in accordance with one exemplary embodiment includes switches 30 and 58 that are located on the dashboard 76 of the vehicle 10. The switches 30 and 58 could alternatively be located on any portion of the vehicle 10 in accordance with other exemplary embodiments. For example, the switches 30 and 58 may be located on the head unit 14. Additionally, the switches 30 and 58 can be mechanical or electrical in nature in accordance with different embodiments. As shown, the head unit 14 is located in the center dash console 80 of the vehicle 10 but may be located on other portions of dashboard 76 or can be located on the floor of the vehicle 10 in other embodiments. The relays 24, 32, 44, 50, 54, 60, 64 and 70 are located next to one another to form a relay bank 78. The relay bank 78 can be hidden from view under the seats of the vehicle 10 or may be located inside of the dashboard 76 or in a box provided with the sound system 14. In this regard, the relay bank 78 may be referred to as a hide-a-way unit. Such a design of the sound system 14 allows for instillation into a vehicle 10. Appropriate electrical harnesses 82 can be attached to the relay bank 78 in order to route suitable wiring between the relays, head unit 18 and variously assorted speakers of the sound system 14. The relay bank 78 may therefore be remote from the switches 30 and 58 so that they are located at different portions of the vehicle 10. In this regard, relay bank 78 could be located at a different elevation in the vehicle 10 than the switches 30 and 58. It is to be understood, however, that other embodiments exist in which the relay bank 78 and switches 30 and 58 are not remote from one another but are located at the same place in vehicle 10 or are mounted onto a common frame or console. Further embodiments exist in which various components of the sound system 14 are not hidden away but are instead in view in the vehicle 10.

The sound system 14 thus affords in one exemplary embodiment a way of controlling the location of sound generated inside or outside of the vehicle 10. The use of relays allows the sound system 14 to utilize a robust design and enjoy ease of manufacture. The use of relays also allows the sound system 14 to achieve cost savings over previously designed sound systems. The sound system 14 can use electromechanical components to effect the transfer of sound between speakers. Sound transfer between speakers can be accomplished through the flipping of a single switch 30. However, other embodiments exist in which sound transfer can be accomplished through flipping of two switches 30 and 58. It is to be understood that additional embodiments exist in which more than two switches can be employed to achieve sound transfer between speakers. Although described as being employed with a vehicle 10 it is to be understood that this is for sake of example regarding certain exemplary embodiments of sound system 14. It is to be understood that other exemplary embodiments exist in which the sound system 14 need not be used in relation to a vehicle 10.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed:

1. A sound system, comprising:

a power source;

a head unit powered by said power source, said head unit configured for generating an electrical signal;

a relay in communication with said head unit and configured for receiving an electrical signal generated by said head unit, wherein said relay has a first output so as to direct an electrical signal therefrom, and wherein said relay has a second output so as to direct an electrical signal therefrom;

a first speaker in communication with said relay, wherein said first speaker is configured for receiving an electrical signal from said first output of said relay;

a second speaker in communication with said relay, wherein said second speaker is configured for receiving an electrical signal from said second output of said relay;

a switch configured to be opened and closed in order to trip said relay between a first state in which said relay is configured to direct an electrical signal from said first output to said first speaker and a second state in which said relay is configured to direct an electrical signal from said second output to said second speaker;

a second relay in communication with said head unit and configured for receiving an electrical signal generated by said head unit, wherein said second relay has a first output so as to direct an electrical signal therefrom, and wherein said second relay has a second output so as to direct an electrical signal therefrom;

a third speaker in communication with said second relay, wherein said third speaker is configured for receiving an electrical signal from said first output of said second relay; and a fourth speaker in communication with said second relay, wherein said fourth speaker is configured for receiving an electrical signal from said second output of said second relay;

wherein said second relay is configured to be tripped upon opening and closing of said switch between a first state in which said second relay is configured to direct an electrical signal from said first output of said second relay to said third speaker and a second state in which said second relay is configured to direct an electrical signal from said second output of said second relay to said fourth speaker;

wherein in one position of said switch both said first relay and said second relay are in the first state and in another position of said switch both said first relay and said second relay are in the second state.

2. The sound system as set forth in claim 1, further comprising:

a third relay in communication with said head unit and configured for receiving an electrical signal generated by said head unit, wherein said third relay has a first output so as to direct an electrical signal therefrom;

a fifth speaker in communication with said third relay, wherein said fifth speaker is configured for receiving an electrical signal from said first output of said third relay;

a fourth relay in communication with said head unit and configured for receiving an electrical signal generated by said head unit, wherein said fourth relay has a first output so as to direct an electrical signal therefrom; and a sixth speaker in communication with said fourth relay, wherein said sixth speaker is configured for receiving an electrical signal from said first output of said fourth relay;

wherein said third relay is configured to be tripped upon opening and closing of said switch between a first state in which said third relay is configured to direct an electrical signal from said first output of said third relay to said fifth speaker and a second state in which said third relay is not configured to direct an electrical signal from said first output of said third relay to said fifth speaker;

wherein said fourth relay is configured to be tripped upon opening and closing of said switch between a first state in which said fourth relay is configured to direct an electrical signal from said first output of said fourth relay to said sixth speaker and a second state in which said fourth relay is not configured to direct an electrical signal from said first output of said fourth relay to said sixth speaker;

wherein in one position of said switch said first relay, said second relay, said third relay and said fourth relay are in the first state and in another position of said switch said first relay, said second relay, said third relay and said fourth relay are in the second state.

3. The sound system as set forth in claim 2, wherein said first speaker, said third speaker, said fifth speaker and said sixth speaker are located in a vehicle and are positioned so as to direct sound produced therefrom primarily into the interior passenger compartment of the vehicle, and wherein said second speaker and said fourth speaker are located in the vehicle and are positioned so as to direct sound produced therefrom primarily outside of the interior passenger compartment of the vehicle.

4. The sound system as set forth in claim 2, further comprising:

a first additional relay in communication with said head unit and configured for receiving an electrical signal generated by said head unit, wherein said first additional relay has a first output so as to direct an electrical signal therefrom, wherein said second speaker is configured for receiving an electrical signal from said first output of said first additional relay;

a second switch configured to be opened and closed in order to trip said first additional relay between a first state in which said first additional relay is not configured to direct an electrical signal from said first output of said first additional relay to said second speaker and a second state in which said first additional relay is configured to direct an electrical signal from said first output of said first additional relay to said second speaker.

5. The sound system as set forth in claim 4, further comprising:

a second additional relay in communication with said head unit and configured for receiving an electrical signal generated by said head unit; wherein said second additional relay has a first output so as to direct an electrical signal therefrom, wherein said fourth speaker is configured for receiving an electrical signal from said first output of said second additional relay;

wherein said second additional relay is configured to be tripped upon opening and closing of said second switch between a first state in which said second additional relay is not configured to direct an electrical signal from said first output of said second additional relay to said fourth speaker and a second state in which said second additional relay is configured to direct an electrical signal from said first output of said second additional relay to said fourth speaker;

wherein in one position of said second switch said first additional relay and said second additional relay are in the first state and in another position of said second switch said first additional relay and said second additional relay are in the second state.

6. The sound system as set forth in claim 5, further comprising:

a third additional relay in communication with said head unit and configured for receiving an electrical signal generated by said head unit, wherein said third additional relay has a first output so as to direct an electrical signal therefrom;

a seventh speaker in communication with said third additional relay, wherein said seventh speaker is configured for receiving an electrical signal from said first output of said third additional relay;

a fourth additional relay in communication with said head unit and configured for receiving an electrical signal generated by said head unit, wherein said fourth additional relay has a first output so as to direct an electrical signal therefrom; and an eighth speaker in communication with said fourth additional relay, wherein said eighth speaker is configured for receiving an electrical signal from said first output of said fourth additional relay;

wherein said third additional relay is configured to be tripped upon opening and closing of said switch between a first state in which said third additional relay is configured to direct an electrical signal from said first output of said third additional relay to said seventh speaker and a second state in which said third additional relay is not configured to direct an electrical signal from said first output of said third additional relay to said seventh speaker;

wherein said fourth additional relay is configured to be tripped upon opening and closing of said switch between a first state in which said fourth additional relay is configured to direct an electrical signal from said first output of said fourth additional relay to said eighth speaker and a second state in which said fourth additional relay is not configured to direct an electrical signal from said first output of said fourth additional relay to said eighth speaker;

wherein in one position of said switch said first relay, said second relay, said third relay, said fourth relay, said third additional relay and said fourth additional relay are in the first state and in another position of said switch said first relay, said second relay, said third relay, said fourth relay, said third additional relay and said fourth additional relay are in the second state.

7. A sound system for a vehicle, comprising:

a head unit configured for generating an electrical signal;

a relay configured to receive an electrical signal from said head unit, wherein said relay has a first output and a second output;

an interior speaker carried by the vehicle and positioned so as to direct sound produced therefrom primarily into the interior passenger compartment of the vehicle, wherein said interior speaker is configured for receiving an electrical signal from said relay in order to produce sound;

an exterior speaker carried by the vehicle and positioned so as to direct sound produced therefrom primarily outside of the interior passenger compartment of the vehicle, wherein said exterior speaker is configured for receiving an electrical signal from said relay in order to produce sound;

a switch configured to be opened and closed in order to trip said relay between a first state in which said interior speaker produces sound and said exterior speaker does not produce sound and a second state in which said interior speaker does not produce sound and said exterior speaker produces sound;

a second relay configured to receive an electrical signal from said head unit, wherein said second relay has a first output and a second output;

a second interior speaker carried by the vehicle and positioned so as to direct sound produced therefrom primarily into the interior passenger compartment of the vehicle, wherein said second interior speaker is configured for receiving an electrical signal from said second relay in order to produce sound; and a second exterior speaker carried by the vehicle and positioned so as to direct sound produced therefrom primarily outside of the interior passenger compartment of the vehicle, wherein said second exterior speaker is configured for receiving an electrical signal from said second relay in order to produce sound;

wherein said switch is configured to be opened and closed in order to trip said first and second relays between a first state in which said interior speaker and said second interior speaker produce sound and said exterior speaker and said second exterior speaker do not produce sound and a second state in which said interior speaker and said second interior speaker do not produce sound and said exterior speaker and said second exterior speaker produce sound.

8. The sound system as set forth in claim 7, further comprising:

a first exterior relay configured to receive an electrical signal from said head unit, wherein said exterior speaker is configured for receiving an electrical signal from said first exterior relay in order to produce sound;

a second exterior relay configured to receive an electrical signal from said head unit, wherein said second exterior speaker is configured for receiving an electrical signal from said second exterior relay in order to produce sound; and a second switch configured to be opened and closed in order to trip said first exterior relay and said second exterior relay between a first state in which said exterior speaker and said second exterior speaker produce sound and a second state in which said exterior speaker and said second exterior speaker do not produce sound.

9. A sound system for a vehicle, comprising:

a head unit configured for generating an electrical signal;

a relay configured to receive an electrical signal from said head unit, wherein said relay has a first output and a second output;

an interior speaker carried by the vehicle and positioned so as to direct sound produced therefrom primarily into the interior passenger compartment of the vehicle, wherein said interior speaker is configured for receiving an electrical signal from said relay in order to produce sound;

an exterior speaker carried by the vehicle and positioned so as to direct sound produced therefrom primarily outside of the interior passenger compartment of the vehicle, wherein said exterior speaker is configured for receiving an electrical signal from said relay in order to produce sound;

a switch configured to be opened and closed in order to trip said relay between a first state in which said interior speaker produces sound and said exterior speaker does not produce sound and a second state in which said interior speaker does not produce sound and said exterior speaker produces sound;

a first additional interior relay configured to receive an electrical signal from said head unit;

a second additional interior relay configured to receive an electrical signal from said head unit;

a first additional interior speaker carried by the vehicle and positioned so as to direct sound produced therefrom primarily into the interior passenger compartment of the vehicle, wherein said first additional interior speaker is configured for receiving an electrical signal from said first additional interior relay in order to produce sound; and a second additional interior speaker carried by the vehicle and positioned so as to direct sound produced therefrom primarily into the interior passenger compartment of the vehicle, wherein said second additional interior speaker is configured for receiving an electrical signal from said second additional interior relay in order to produce sound;

wherein said switch is configured to be opened and closed in order to trip said first relay, said first additional interior relay and said second additional interior relay between a first state in which said interior speaker, said first additional interior speaker and said second additional interior speaker produce sound and said exterior speaker does not produce sound and a second state in which said interior speaker, said first additional interior speaker and said second additional interior speaker do not produce sound and said exterior speaker produces sound.

10. A sound system for a vehicle, comprising:

a head unit configured for generating an electrical signal;

a relay configured to receive an electrical signal from said head unit, wherein said relay has a first output and a second output;

an interior speaker carried by the vehicle and positioned so as to direct sound produced therefrom primarily into the interior passenger compartment of the vehicle, wherein said interior speaker is configured for receiving an electrical signal from said relay in order to produce sound;

an exterior speaker carried by the vehicle and positioned so as to direct sound produced therefrom primarily outside of the interior passenger compartment of the vehicle, wherein said exterior speaker is configured for receiving an electrical signal from said relay in order to produce sound;

a switch configured to be opened and closed in order to trip said relay between a first state in which said interior speaker produces sound and said exterior speaker does not produce sound and a second state in which said interior speaker does not produce sound and said exterior speaker produces sound;

a first exterior relay configured to receive an electrical signal from said head unit, wherein said exterior speaker is configured for receiving an electrical signal from said first exterior relay in order to produce sound; and a second switch configured to be opened and closed in order to trip said first exterior relay between a first state in which said exterior speaker produces sound and a second state in which said exterior speaker does not produce sound.

11. A sound system for a vehicle, comprising:

a head unit configured for generating an electrical signal;

a relay configured to receive an electrical signal from said head unit, wherein said relay has a first output and a second output;

an interior speaker carried by the vehicle and positioned so as to direct sound produced therefrom primarily into the interior passenger compartment of the vehicle, wherein said interior speaker is configured for receiving an electrical signal from said relay in order to produce sound;

an exterior speaker carried by the vehicle and positioned so as to direct sound produced therefrom primarily outside of the interior passenger compartment of the vehicle, wherein said exterior speaker is configured for receiving an electrical signal from said relay in order to produce sound;

a switch configured to be opened and closed in order to trip said relay between a first state in which said interior speaker produces sound and said exterior speaker does not produce sound and a second state in which said interior speaker does not produce sound and said exterior speaker produces sound;

an amplifier configured to receive electrical signals from said head unit;

a first subwoofer relay configured to receive an electrical signal from said head unit through said amplifier;

a second subwoofer relay configured to receive an electrical signal from said head unit through said amplifier;

a first subwoofer carried by the vehicle and positioned so as to direct sound produced therefrom primarily into the interior passenger compartment of the vehicle, wherein said first subwoofer is configured for receiving an electrical signal from said first subwoofer relay in order to produce sound; and a second subwoofer carried by the vehicle and positioned so as to direct sound produced therefrom primarily into the interior passenger compartment of the vehicle, wherein said second subwoofer is configured for receiving an electrical signal from said second subwoofer relay in order to produce sound;

wherein said switch is configured to be opened and closed in order to trip said first relay, said first subwoofer relay and said second subwoofer relay between a first state in which said interior speaker, said first subwoofer and said second subwoofer produce sound and said exterior speaker does not produce sound and a second state in which said interior speaker, said first subwoofer and said second subwoofer do not produce sound and said exterior speaker produces sound.

12. A method for controlling a sound system of a vehicle comprising the steps of:

sending an electrical signal to a relay;

switching said relay between an open and closed position in which said relay directs an electrical signal out of a first outlet in one of said open and closed positions and out of a second outlet in the other of said open and closed positions;

generating a sound directed primarily into the interior passenger compartment of the vehicle when an electrical signal is transferred from said first outlet of said relay;

generating a sound directed primarily outside of the interior passenger compartment of the vehicle when an electrical signal is transferred from said second outlet of said relay;

wherein said step of generating a sound directed primarily into the interior passenger compartment of the vehicle includes generating sound from a pair of front speakers and a pair of back speakers located generally in the interior of the vehicle, and wherein said step of generating a sound directed primarily outside of the interior passenger compartment of the vehicle includes generating sound from a pair of external speakers located generally outside of the interior of the vehicle, and wherein said switching step causes sound to be generated either by said speakers located generally in the interior of the vehicle or by said speakers located generally outside of the interior of the vehicle.

13. A method for controlling a sound system of a vehicle comprising the steps of:

sending an electrical signal to a relay;

switching said relay between an open and closed position in which said relay directs an electrical signal out of a first outlet in one of said open and closed positions and out of a second outlet in the other of said open and closed positions;

generating a sound directed primarily into the interior passenger compartment of the vehicle when an electrical signal is transferred from said first outlet of said relay;

generating a sound directed primarily outside of the interior passenger compartment of the vehicle when an electrical signal is transferred from said second outlet of said relay;

sending an electrical signal to a first external relay;

switching said first external relay between an open and closed position in which said first external relay directs an electrical signal out of a first outlet in one of said open and closed positions; and generating a sound directed primarily outside of the interior passenger compartment of the vehicle when an electrical signal is transferred from said first outlet of said first external relay.

* * * * *